US 11,781,442 B2

(12) United States Patent
Girardeau

(10) Patent No.: US 11,781,442 B2
(45) Date of Patent: Oct. 10, 2023

(54) TURBINE HAVING AN INTERNAL SECONDARY SPACE EQUIPPED WITH FINS FOR CORRECTING GYRATION OF AN AIRFLOW

(71) Applicant: SAFRAN AIRCRAFT ENGINES, Paris (FR)

(72) Inventor: Julian Nicolas Girardeau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/760,340

(22) PCT Filed: Feb. 15, 2021

(86) PCT No.: PCT/FR2021/050263
§ 371 (c)(1),
(2) Date: Aug. 8, 2022

(87) PCT Pub. No.: WO2021/165605
PCT Pub. Date: Aug. 26, 2021

(65) Prior Publication Data
US 2023/0120507 A1 Apr. 20, 2023

(30) Foreign Application Priority Data

Feb. 18, 2020 (FR) ...................................... 2001576

(51) Int. Cl.
*F01D 11/12* (2006.01)
*F01D 11/24* (2006.01)
(Continued)

(52) U.S. Cl.
CPC .......... *F01D 11/122* (2013.01); *F01D 11/001* (2013.01); *F01D 11/24* (2013.01);
(Continued)

(58) Field of Classification Search
CPC .... F01D 11/001; F01D 11/122; F01D 11/125; F01D 11/127; F01D 11/24; F01D 25/12; F05D 2240/55
See application file for complete search history.

(56) References Cited

U.S. PATENT DOCUMENTS 4,094,673 A * 6/1978 Erickson ................. C22C 49/08
75/229
5,536,022 A * 7/1996 Sileo ..................... F01D 11/122
415/174.4

(Continued)

FOREIGN PATENT DOCUMENTS

EP 3 324 001 A1 5/2018
FR 3 027 343 A1 4/2016
(Continued)

OTHER PUBLICATIONS

International Search Report dated Apr. 21, 2021 in PCT/FR2021/050263, filed on Feb. 15, 2021, 2 pages.
French Preliminary Search Report dated Sep. 3, 2020 in French Application 2001576, filed on Feb. 18, 2020, 2 pages (with English translation of Categories of Cited Documents).

*Primary Examiner* — Christopher Verdier
(74) *Attorney, Agent, or Firm* — Oblon, McClelland, Maier & Neustadt, L.L.P.

(57) ABSTRACT

A turbine includes a rotor surrounded by a stator, a first movable stage including a series of rotating vanes, a second movable stage including a second series of rotating vanes, a distributor including a series of stationary vanes, the vanes including platforms jointly delimiting a separation between a main space in which a hot flow circulates through the vanes, and a secondary space surrounding a hub of the rotor. The rotor includes an aperture through which air is blown towards the secondary space, this air being discharged towards the main space. Straightening fins are carried by the (Continued)

distributor in the secondary space for straightening the air flow in order to change its gyration.

10 Claims, 3 Drawing Sheets

(51) Int. Cl.
*F01D 25/12* (2006.01)
*F01D 11/00* (2006.01)

(52) U.S. Cl.
CPC .......... *F01D 25/12* (2013.01); *F05D 2220/30* (2013.01); *F05D 2240/55* (2013.01); *F05D 2260/20* (2013.01)

(56) References Cited

U.S. PATENT DOCUMENTS

| | | | |
|---|---|---|---|
| 2014/0003919 A1* | 1/2014 | Lee | F01D 11/001 415/173.7 |
| 2014/0205442 A1 | 7/2014 | Luneau et al. | |
| 2014/0286760 A1* | 9/2014 | Lee | F01D 11/04 415/170.1 |
| 2016/0169024 A1 | 6/2016 | Beaujard et al. | |
| 2018/0135449 A1 | 5/2018 | Klingels | |

FOREIGN PATENT DOCUMENTS

| | | |
|---|---|---|
| GB | 2533221 A | 6/2016 |
| WO | WO 2012/150424 A | 11/2012 |

* cited by examiner

FIG. 1 - PRIOR ART

TURBINE HAVING AN INTERNAL SECONDARY SPACE EQUIPPED WITH FINS FOR CORRECTING GYRATION OF AN AIRFLOW

TECHNICAL FIELD

The invention relates to the sealing in a turbine of a turbomachine between a rotatably movable element and a stationary element, such as a rotor element and a stationary distributor impeller surrounding this rotor element.

PRIOR ART

A turbomachine turbine generally comprises a hub rotating about a main axis, which carries movable stages of blades spaced apart from each other along this axis, and a stationary revolution casing surrounding the assembly.

Between two consecutive movable stages, a stage of stationary blades, called a distributor, is interposed for straightening air longitudinally before it passes through the next movable stage.

In FIG. 1, a portion 1 of a turbomachine turbine comprises a rotor 2 rotating about a longitudinal axis AX, this rotor comprising a first disc 3 which carries a first series of radial rotating vanes 4 forming a first movable stage 6, and a second disc 7 carrying a second series of radial rotating vanes 8 forming a second movable stage 9.

This portion comprises a stationary distributor stage 11 longitudinally interposed between these two movable stages 6 and 9, which comprises a series of stationary vanes 12 carried at their radially external ends by a not represented stationary casing surrounding the assembly and forming a stator therewith.

Each stationary vane 12 includes a platform 13 at its radially internal end, and the platforms of the different vanes 12 are circumferentially adjoining each other to jointly form an inner shroud of the distributor 11.

Similarly, each rotating vane 4 also includes a platform 14 at its radially internal end, and each rotating vane 8 includes a platform 16 at its radially internal end. As visible in FIG. 1, the platforms of the different vanes jointly form a wall which is generally shaped like a portion of a cone. This wall separates a main annular space, called the primary stream and denoted as VP, which is occupied by the vanes 4, 8, 12 and through which a hot gas flow passes, from a secondary internal space surrounding the rotor, called the sub-distributor cavity, which is maintained at a lower temperature than the hot flow.

Each platform 13 of the distributor 11 includes a body 17 generally shaped like a portion of a cylinder which carries a rib 18 extending radially towards the axis AX. The set of ribs 18 of the platforms 13 thus has a planar ring shape coaxial with the axis AX.

The set of ribs 18 carries an inner shroud 19, carrying on its internal face an abradable element 21 facing the axis AX, and against which lips 22 carried by the rotor 2, rub. The lips 22 are located between the first disc 3 and the second disc 7, to provide barrier between an internal upstream secondary space E1 located between the first disc 3 and the shroud 19, and an internal downstream secondary space E2 located between the shroud 19 and the second disc 7.

As visible in FIG. 1, the lips 22 and both discs 3 and 7 are part of the rotor 2. A flow of bleed air AP is blown through an aperture 24 of the rotor 2 into the space E1 to cool it. Part of this air is discharged through a gap I1 separating the platform 14 of the vane 4 from the platform 13 of the stationary vane 12. The other part of this air passes through the barrier formed by the lips 22 and the abradable element 21 to bleed the downstream secondary space E2, this other part being discharged through a gap I2 separating the platform 13 of the stationary vane 12 from the platform 16 of the vane 8.

The bleed air AP makes it possible to limit air entry from the hot flow through the gaps I1 and I2 to both limit leakage of air from the hot flow and to allow the secondary spaces E1 and E2 to be maintained at a desired temperature.

Nevertheless, when the bleed air AP passes through the gaps I1 and I2 to be discharged, it generates vortices in the hot flow locally, which leads to a drop in efficiency, also called mixing loss.

The purpose of the invention is to provide a solution to remedy this drawback.

DISCLOSURE OF THE INVENTION

To this end, one object of the invention is a turbomachine turbine extending about an axis, comprising a rotor provided with a sealing lip and a stator surrounding the rotor, the rotor being rotatably mounted in the stator, the stator comprising a distributor provided with a platform from which at least one stationary vane extends along a radial direction, this platform carrying a main abradable sealing element cooperating with the lip, the platform radially delimiting a separation between a main space through which a flow of hot air passes and a secondary air circulation space which radially extends between the lip and the main space, the rotor comprising an aperture through which air is blown to pass through the secondary space and reach the main space, characterised in that the distributor includes a mainly radially extending flange carrying straightening fins located in the secondary space for straightening the air flow passing through the secondary space in order to modify its gyration before it is discharged towards the main space.

With this solution, the gyration of the bleed flow reinjected into the hot flow through the gaps is close to the gyration of the hot flow, so as to reduce the so-called mixing losses.

The invention also relates to a turbine thus defined, wherein the secondary space comprises an upstream secondary space and a downstream secondary space separated from each other by a main sealing barrier comprising at least the lip sliding along the main abradable element disposed opposite to the lip, the aperture of the rotor leading to the upstream secondary space, the turbine comprising, on the one hand, upstream straightening fins carried by the distributor and located in the upstream secondary space and, on the other hand, downstream straightening fins carried by the distributor and located in the downstream secondary space to straighten the air flow passing through the downstream secondary space in order to modify its gyration before it is discharged towards the main space.

The invention also relates to a turbine thus defined, wherein the upstream straightening fins are arranged to reduce gyration of the flow passing through the upstream secondary space, and wherein the downstream straightening fins are arranged to increase gyration of the flow passing through the downstream secondary space.

The invention also relates to a turbine thus defined, comprising an upstream secondary sealing barrier located in the upstream secondary space, upstream of the upstream fins, the aperture of the rotor leading between the upstream secondary sealing barrier and the main sealing barrier, so that most of the air admitted through the aperture is straightened by the upstream fins before leaving the upstream secondary space to join the main space.

The invention also relates to a turbine thus defined, comprising a downstream secondary sealing barrier located in the downstream secondary space downstream of the downstream straightening fins, and wherein the downstream secondary space is supplied with air from the aperture of the rotor passing through the main sealing barrier to join the main space.

The invention also relates to a turbine thus defined, wherein the upstream secondary sealing barrier includes an upstream lip carried by the rotor and disposed opposite to an upstream abradable element carried by the distributor.

The invention also relates to a turbine thus defined, wherein the downstream secondary sealing barrier includes a downstream lip carried by the rotor and disposed opposite to a downstream abradable element carried by the distributor.

The invention also relates to a turbine thus defined, wherein the main abradable sealing element is connected to the upstream abradable element via the upstream straightening fins, and wherein the main abradable sealing element is connected to the downstream abradable sealing element via the downstream straightening fins.

The invention also relates to a turbine thus defined, wherein the straightening fins have blade shapes.

The invention also relates to a turbomachine comprising a turbine thus defined.

DETAILED DESCRIPTION OF THE INVENTION

Figure 1:
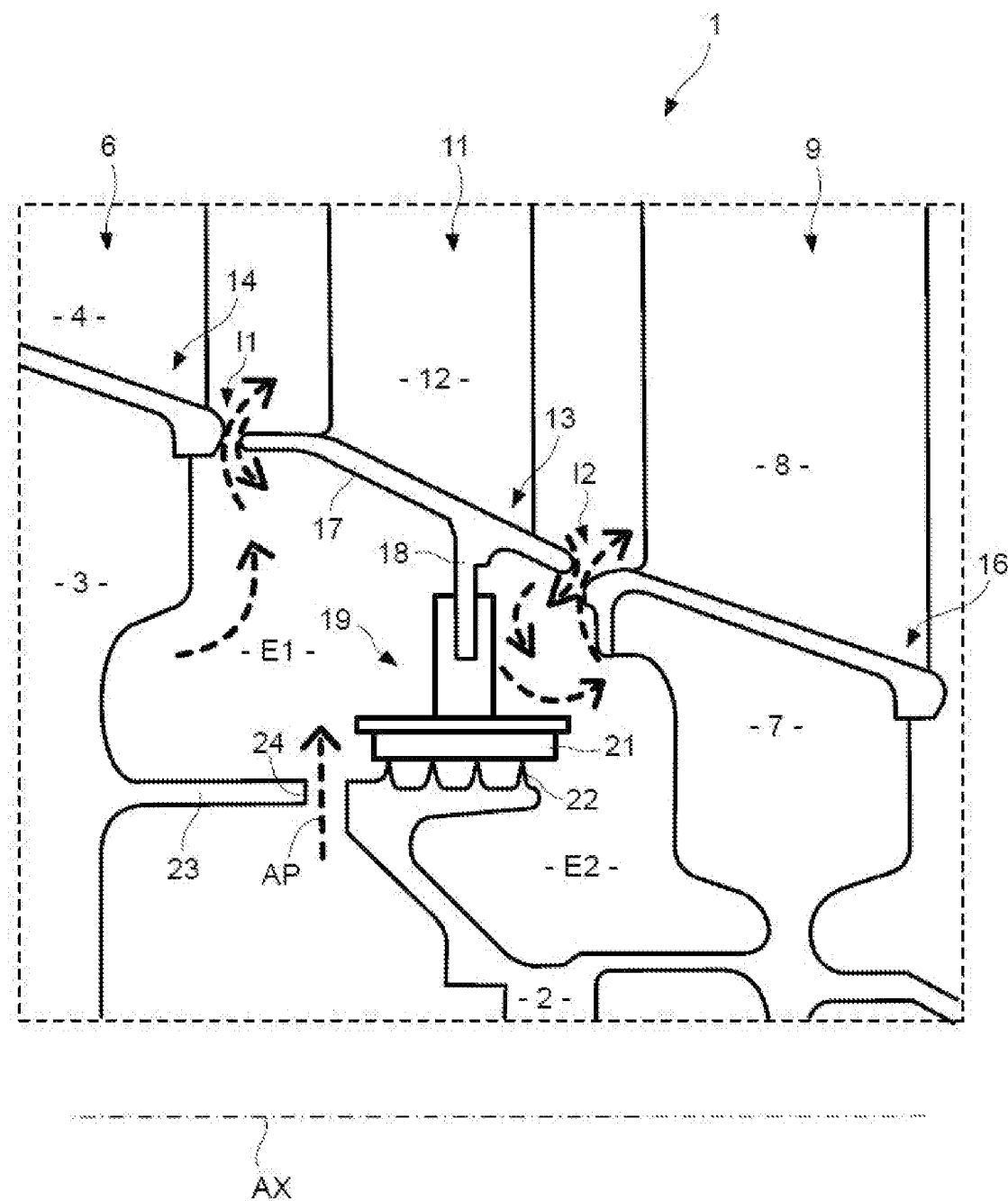
FIG. 1 is a longitudinal cross-section view of a known turbine portion.
Figure 2:
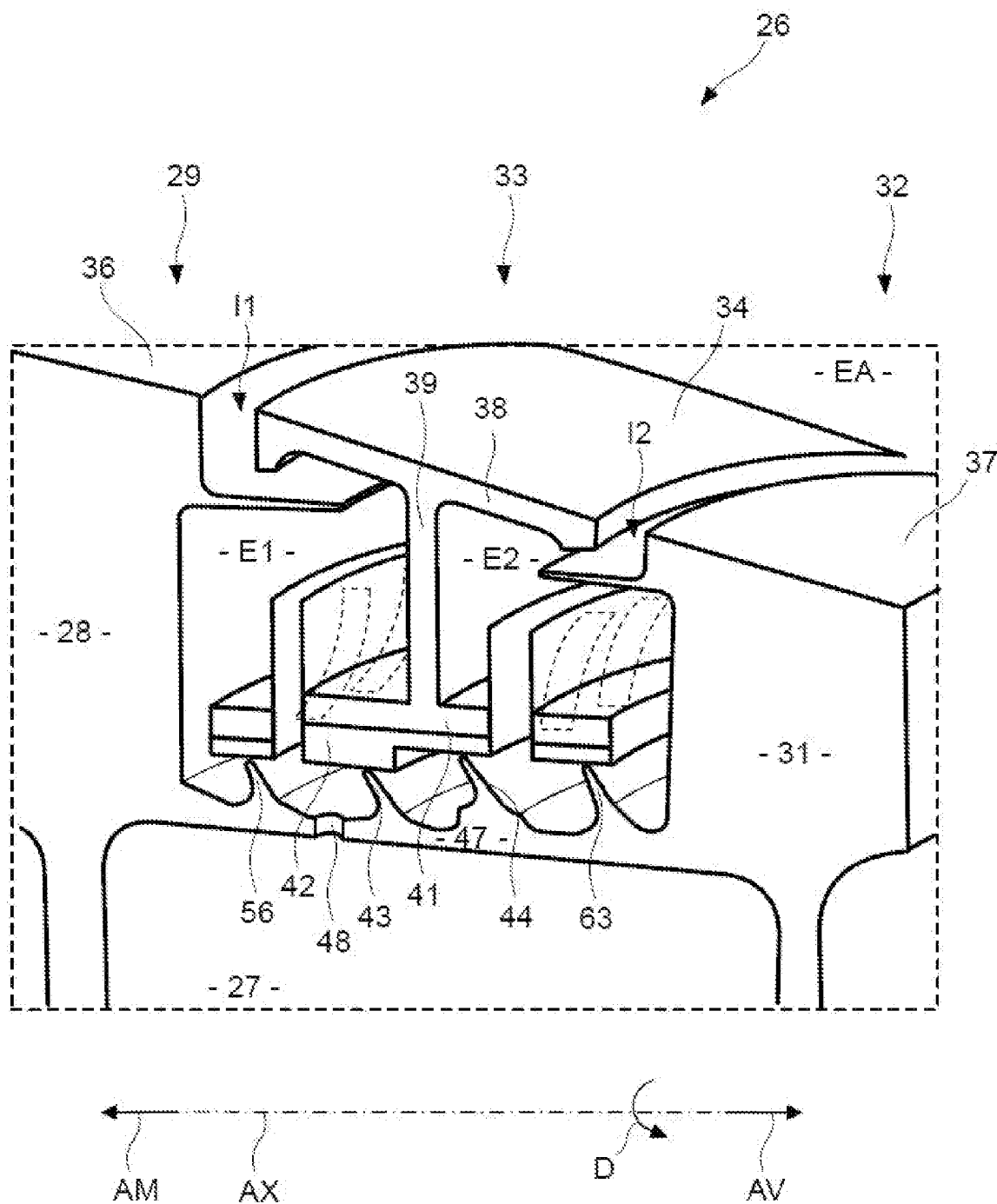
FIG. 2 is a longitudinal cross-section view of a turbine portion according to the invention.

In FIG. 2, a portion 26 of a turbomachine turbine includes a rotor 27 rotating about a longitudinal axis AX, this rotor comprising a first disc 28 which carries a first series of not represented rotating vanes forming a first movable stage 29, and a second disc 31 carrying a second series of not represented rotating vanes forming a second movable stage 32.

It includes a stationary distributor stage 33 longitudinally interposed between these two movable stages 29 and 32, which comprises a series of not represented stationary vanes carried at their radially external ends by a not represented stationary casing surrounding the assembly and forming a stator with the distributor 33.

Each stationary vane includes a platform 34 at its radially internal end, and the platforms of the different vanes are circumferentially adjoining each other to jointly form an inner shroud of the distributor 33.

Each rotating vane of the first stage also includes a platform 36 at its radially internal end, and each rotating vane of the second stage includes a platform 37 at its radially internal end. The platforms jointly form a wall which is generally shaped like a portion of a cone. This wall separates a main annular space EA, called the primary stream, which is occupied by the vanes and through which a hot gas flow passes, from a secondary internal space surrounding the rotor, called the sub-distributor cavity, whose temperature is lower than the hot flow.

Each platform 34 of the distributor 33 includes a body 38 generally shaped like a portion of a cylinder which carries a rib 39 extending radially towards the axis AX. The set of ribs 39 on the platforms 34 thus has a planar ring shape coaxial with the axis AX.

The set of ribs 39 carries an internal support 41, carrying on its internal face a main abradable sealing element 42 facing the axis AX, and against which two lips 43, 44, carried by the rotor 27, rub. These lips 43, 44 are located between the first disc 28 and the second disc 31, and they slide along the main abradable element 42 to form with the latter a central main barrier B0 separating an upstream secondary space E1 located between the first disc 28 and the internal support 41, from an internal downstream secondary space E2 located between the internal support 41 and the second disc 31.

The lips 43, 44 are carried by a hub 47 being part of the rotor 27 by being rigidly integral with the two discs 28 and 31 of this rotor. A flow of bleed air AP is blown through an aperture 48 of the rotor which is formed in this hub 47, this air flow coming from an internal region of the rotor to circulate towards the secondary space E1.

Due to the rotation of the rotor, air AP admitted into the space E1 has a high gyration, that is a velocity whose circumferential component is large in comparison with its radial component.

According to the invention, the distributor 33 carries, here at a flange 49 attached to the upstream edge of the support 41, a series of straightening fins 51 arranged to centrifuge the bleed air AP in order to reduce its gyration. More concretely, these fins straighten the flow to increase its radial component and/or reduce its circumferential component as it travels towards the gap I1.

Figure 3:
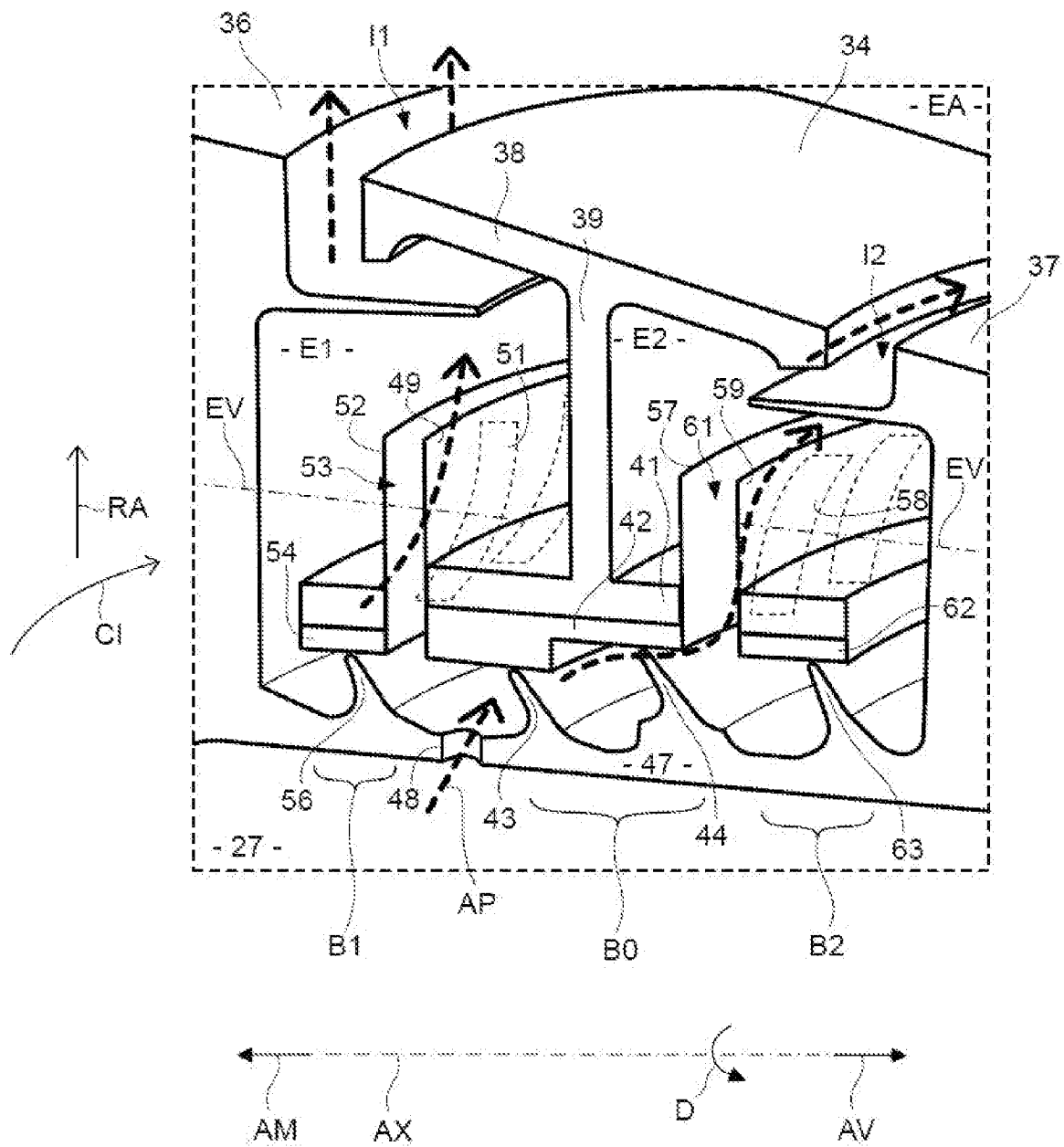
FIG. 3 is a more detailed view of the turbine portion according to the invention.

As visible in FIGS. 2 and 3, the annular flange 49, which is of generally planar shape and orientation normal to the axis AX, and the fins 51 carried on this ring extend perpendicularly to the latter while having an overall orientation inclined at approximately 45° with respect to the circumferential direction CI. These fins 51 are circumferentially spaced from each other evenly on the upstream face of the flange 49.

In the example of the figures, the end closest to the axis AX of each fin 51 has a circumferential orientation CI while its opposite end, that is closest to the gap I1, has a radial orientation RA. Advantageously, these fins 51 are curved, in this case in the form of an arc of a circle, to increase their centrifugal effect. This curvature is oriented along a direction corresponding to the central fin region moving closer to the central axis. Thus, the fins 51 are arranged to reduce gyration of the air flow when the rotor rotates in the forward direction denoted as D in the figures. More generally, each fin 51 has a blade shape with a span axis EV oriented orthoradially.

Complementarily, in order to better channel air AP to be centrifuged, another upstream flange 52 parallel to the flange 49 is attached to the upstream edges of the fins 51 in order to delimit, with the flange 49, an upstream annular corridor 53 circumferentially partitioned by the fins 51. This upstream flange 52 further carries an upstream abradable element 54 cooperating with an upstream lip 56 carried by the hub 47 to form an upstream secondary sealing barrier B1.

The admission aperture 48 for the bleed air AP thus leads to an annular space delimited upstream by the barrier B1 and downstream by the main barrier B0. Most of the bleed air AP is thus discharged through the upstream annular corridor 53 so as to be effectively centrifuged in order to form a flow having reduced gyration when it passes through the gap I1 to leave the upstream secondary space E1, as represented by the dashed arrows.

In the example of FIGS. 2 and 3, the downstream secondary space E2 is supplied with bleed air from the aperture 48 and having passed through the main barrier B0, the latter being dimensioned to allow passage of air which is calibrated for this purpose.

As visible in the figures, this downstream bleed air has a low gyration once it has passed through the main barrier. According to the invention, this air is straightened by other fins to increase its gyration as it leaves this downstream internal secondary space through the gap I2.

To this end, the downstream edge of the main abradable element 42 carries an annular downstream flange 57 of generally planar shape and orientation normal to the axis AX, which carries a series of straightening fins 58.

The fins 58 carried by this other ring extend perpendicularly thereto, downstream, while having an overall orientation tilted at approximately 45° with respect to the circumferential direction CI. These fins 58 are circumferentially evenly spaced from each other at the downstream face of the flange 57.

In the example of the figures, the end closest to the axis AX of each fin 58 thus has a radial orientation RA while its opposite end, that is the end closest to the gap I2, has a circumferential orientation CI. Advantageously, these fins 58 are curved, in this case in the form of an arc of a circle, to increase their straightening effect. This curvature is oriented in a direction corresponding to a separation of the central fin region from the central axis. Thus, the fins 58 are arranged to increase gyration of the air flow when the rotor rotates in the forward direction denoted as D in the figures. More generally, each fin 58 is thus shaped like a blade having a span axis EV oriented orthoradially.

In addition, in order to better channel air AP to be straightened, another downstream flange 59 parallel to the flange 57 is attached to the downstream edges of the straightening fins 58 in order to delimit, with the flange 57, a downstream annular corridor 61 circumferentially partitioned by the fins 58. This downstream flange 59 further carries a downstream abradable element 62 cooperating with a downstream lip 63 carried by the hub 47 to form a secondary downstream sealing barrier B2.

The bleed air that has passed through the main barrier B0 thus arrives into a downstream annular space delimited downstream by the downstream barrier B2. Most of the bleed air arriving in this space is thus discharged through the downstream annular corridor 61 so as to be effectively straightened to increase its gyration. More concretely, the fins 58 straighten this air to increase its circumferential component and/or reduce its radial component, to give it a greater gyration when it passes through the gap I2 on leaving the downstream secondary space E2, as represented by the dashed arrows.

As will be understood, the invention makes it possible to reduce the usually strong gyration of the bleed air being discharged through the gap I1 located upstream of the distributor and to increase the usually low gyration of the bleed air being discharged through the gap I2 located downstream of the distributor.

Thus, the bleed air leaving through the two gaps I1 and I2 has a gyration close to that of the hot flow passing through the distributor vanes, which makes it possible to reduce the disturbance caused by this reintroduction into the hot flow, also called mixing losses.

This optimisation of the gyration of the bleed air reintroduced through the gaps I1 and I2 also makes it possible to improve the flow of the bleed air through these gaps, in order to reduce turbulence therein, which makes it possible to limit the flow of hot air likely to enter through the gaps I1 and I2.

In the example shown in the figures, the upstream straightening fins 51 are carried by the flanges 49 and 52 to form an upstream straightening wheel, and the downstream straightening fins 58 are carried by the flanges 57 and 59 to form a downstream straightening wheel. The upstream B1 and downstream B2 barriers provide secondary sealing to increase gyration correction by ensuring that all, or at least most, of the bleed flow is straightened by the fins before being discharged through the gaps.

Other arrangements of straightening fins are contemplatable without departing from the scope of the invention, as long as they allow gyration of the flow of bleed air to be modified before it leaves the internal secondary space.

Furthermore, the invention is set forth in the figures according to one embodiment in which the main barrier as well as the upstream barrier and the downstream barrier are formed by labyrinth-type seals, that is, including one or more lips arranged opposite to an abradable element. The invention applies to an overall analogous structure in which sealing barriers are obtained with other technical solutions as well. In particular, the upstream, downstream and main barriers may be formed by so-called brush seals, that is one surface of which carries strands whose ends bear on another face to ensure the desired sealing.

The invention claimed is:

1. A turbine extending about an axis, comprising a rotor provided with a sealing lip and a stator surrounding the rotor, the rotor being rotatably mounted in the stator, the stator comprising a distributor provided with a platform from which at least one stationary vane extends along a radial direction, the platform carrying a main abradable sealing element cooperating with the lip, the platform radially delimiting a separation between a main space through which a hot air flow passes and a secondary air circulation space which radially extends between the lip and the main space, the rotor comprising an aperture through which air is blown to pass through the secondary space and reach the main space, wherein the distributor comprises a mainly radially extending flange carrying straightening fins which extend into the secondary space to straighten the air flow passing through the secondary space so as to modify its gyration before it is discharged towards the main space.

2. The turbine according to claim 1, wherein the secondary space comprises an upstream secondary space and a downstream secondary space separated from each other by a main sealing barrier comprising the lip and the main abradable sealing element disposed opposite to the lip, the aperture of the rotor leading to the upstream secondary space, the straightening fins comprising, upstream straightening fins carried by the distributor and located in the upstream secondary space and, downstream straightening fins carried by the distributor and located in the downstream secondary space in order to straighten the air flow passing through the downstream secondary space so as to modify its gyration before it is discharged towards the main space.

3. The turbine according to claim 2, wherein the upstream straightening fins are arranged to reduce gyration of the flow passing through the upstream secondary space, and wherein the downstream straightening fins are arranged to increase gyration of the flow passing through the downstream secondary space.

4. The turbine according to claim 2, comprising an upstream secondary sealing barrier located in the upstream secondary space, upstream of the upstream fins, the aperture of the rotor leading between the upstream secondary sealing barrier and the main sealing barrier, so that most of the air admitted through the aperture is straightened by the upstream fins before leaving the upstream secondary space to join the main space.

5. The turbine according to claim 4, comprising a downstream secondary sealing barrier located in the downstream secondary space downstream of the downstream straightening fins, and wherein the downstream secondary space is supplied with air from the aperture of the rotor and passing through the main sealing barrier to join the main space.

6. The turbine according to claim 5, wherein the upstream secondary sealing barrier comprises an upstream lip carried by the rotor and disposed opposite to an upstream abradable element carried by the distributor.

7. The turbine according to claim 6, wherein the downstream secondary sealing barrier comprises a downstream lip carried by the rotor and disposed opposite to a downstream abradable element carried by the distributor.

8. The turbine according to claim 7, wherein the main abradable sealing element is connected to the upstream abradable element via the upstream straightening fins, and wherein the main abradable sealing element is connected to the downstream abradable sealing element via the downstream straightening fins.

9. The turbine according to claim 1, wherein the straightening fins have blade shapes.

10. A turbomachine comprising a turbine according to claim 1.

* * * * *

UNITED STATES PATENT AND TRADEMARK OFFICE
CERTIFICATE OF CORRECTION

PATENT NO. : 11,781,442 B2
APPLICATION NO. : 17/760340
DATED : October 10, 2023
INVENTOR(S) : Girardeau It is certified that error appears in the above-identified patent and that said Letters Patent is hereby corrected as shown below:

In the Claims

In Column 6, Claim 1, Line 58, delete "comprising." and insert -- comprising --, therefor.

In Column 6, Claim 2, Line 60, delete "and," and insert -- and --, therefor.

Signed and Sealed this
Sixteenth Day of July, 2024

Katherine Kelly Vidal
*Director of the United States Patent and Trademark Office*